Aug. 18, 1931.  G. W. ELSEY  1,819,503
HYDRAULIC SHOCK ABSORBER
Filed July 14, 1927
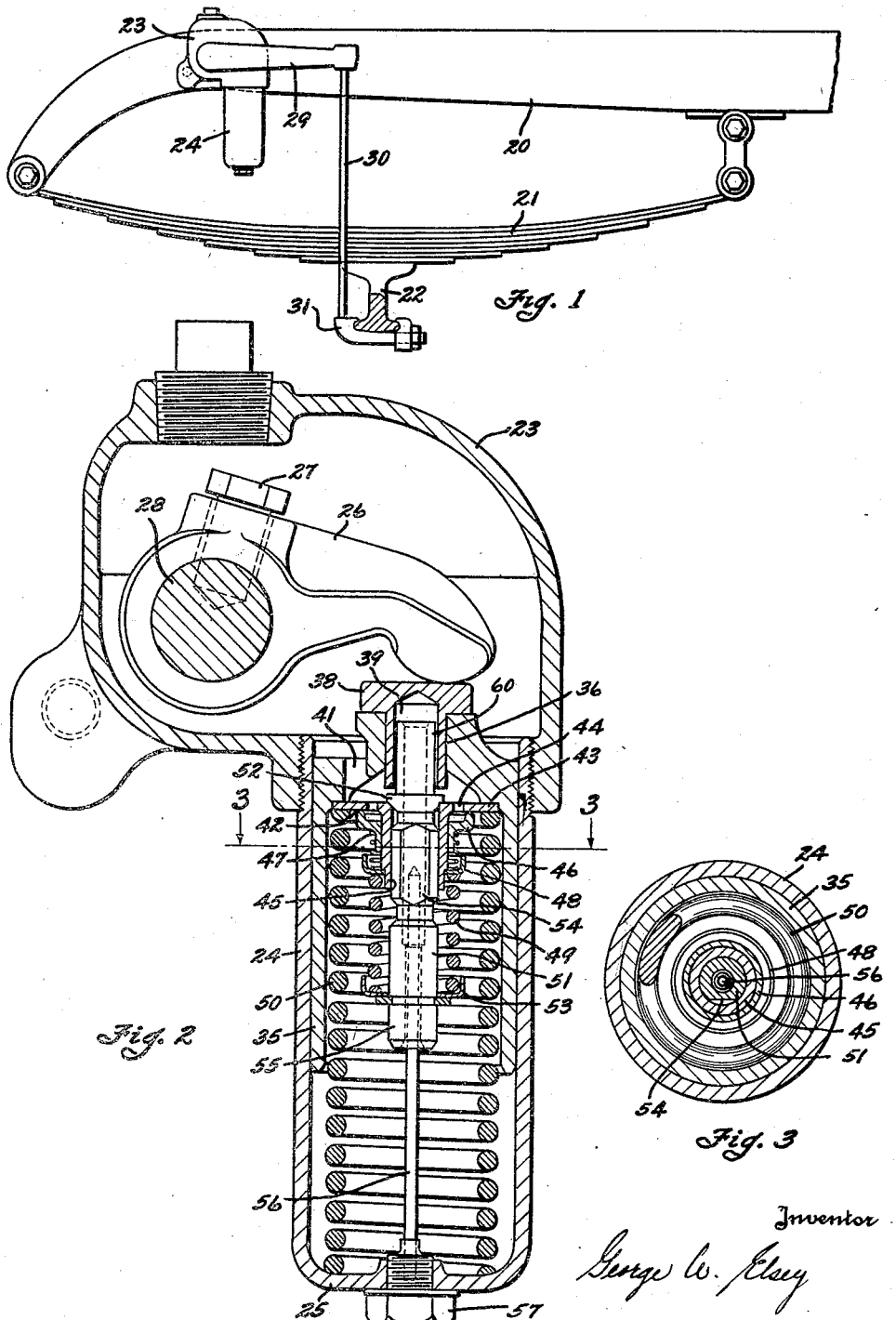

Patented Aug. 18, 1931

1,819,503

UNITED STATES PATENT OFFICE

GEORGE W. ELSEY, OF DAYTON, OHIO, ASSIGNOR, BY MESNE ASSIGNMENTS, TO DELCO PRODUCTS CORPORATION, OF DAYTON, OHIO, A CORPORATION OF DELAWARE

HYDRAULIC SHOCK ABSORBER

Application filed July 14, 1927. Serial No. 205,779.

This invention relates to improvements in rebound checks or shock absorbers particularly adapted for use on automotive and other vehicles which have a frame or body supported by springs upon the road wheel axles.

It is among the objects of the present invention to provide a smooth operating shock absorber or rebound check of simple structure and design, which will permit vehicle springs to function as shock absorber elements when the road bed upon which the vehicle is operating is comparatively smooth, said rebound check, however, controlling the action of the vehicle springs when it is being operated over a substantially rougher road bed.

Another object of the present invention is to provide the shock absorber with substantially silently operating moving parts.

Further objects and advantages of the present invention will be apparent from the following description, reference being had to the accompanying drawings wherein a preferred embodiment of one form of the present invention is clearly shown.

In the drawings:

Fig. 1 is a diagrammatic fragmentary side view showing the vehicle frame and axle and the form of the present invention applied thereto;

Fig. 2 is a longitudinal sectional view of the rebound check or shock absorber; and Fig. 3 is a transverse section taken along the line 3—3 of Fig. 2.

Referring to the drawings, more particularly to the Fig. 1 thereof, the numeral 20 designates the frame member of the vehicle which is supported by springs, one of which is shown at 21, mounted upon an axle 22 to which the road wheels (not shown) are secured. The rebound check includes a bracketed casing 23 providing a fluid reservoir to which is attached one end of the cylinder 24 so as to communicate with said reservoir, the other end of the cylinder being closed as at 25. The bracketed casing 23 is attached in any suitable manner either to the axle 22 or to the frame 20, the present drawings illustrating said casing as secured to the frame. Within the casing 23 there is housed an oscillating lever arm 26 secured by means of screw 27 to a shaft 28, one of which extends outside the casing. The outside end of said shaft 28 has a lever arm 29 secured thereto, the free end of which is connected to a clamping member 31 by means of a strap or cable 30. The clamping member as shown in Fig. 1 is securely held in position on the axle 22.

A piston 35 is reciprocally supported in the cylinder 24. This piston is of the cup shaped type, having a head portion positioned in the cylinder adjacent the casing 23. An aperture 36 is provided in the piston head, coaxial with the wall forming the skirt of the piston. In this aperture there is secured a cap member having a head portion 38, the shank portion of said cap which extends into the aperture 36 being recessed to provide a chamber 39 which communicates with the inside of the piston. The free end of the oscillating arm 26 engages with the cap 38 so that the clockwise rotation of the arm 26 will move the piston into the cylinder. A passage 41 is provided in the piston head adjacent the aperture 36, said passage forming communication between the casing 23 and the interior of the cylinder.

A check valve 42 is supported against the inside surface of the piston head, said check valve controlling the flow of fluid through the passage 41. This check valve comprises a seat member 43 having a plate portion which fits into a recessed part in the inside surface of the piston head. This portion is provided with a plurality of apertures 44 providing communication between the passage 41 and the inside of the cylinder. A projecting sleeve member 45 is secured to or formed integral with the plate portion 43, said sleeve being coaxial with the skirt portion of the piston 35. A cup shaped valve member 46 slidingly fits on the sleeve 45, the edge of said cup shaped member engaging with the one surface of the plate portion 43 so as to entirely encompass and shut off all of the apertures 44. The cup shaped valve member 46 is maintained in engagement with the valve seat member 43 by means of a spring 47 which is interposed between said cup shaped valve member and the spring abutment cup 48 is maintained in position on the sleeve portion 45 by the spring 49. The valve seat member 43 is maintained in position against the inside surface of the piston head by means of the spring 50 which is interposed between said valve seat member and the bottom 25 of the cylinder. This spring, as will be seen, will move the piston in a direction out of the cylinder when the pressure of the arm 26 is released from cap 38.

Within the sleeve portion 45 there is slidably supported a valve 51 which provides parallel passages for the flow of fluid from the cylinder to the casing. Normally this valve has its head portion, designated by the numeral 52, held in engagement with a seat portion formed on the valve seat member 43 so that communication between the passage 41 and the cylinder via the interior of the sleeve 45 is entirely cut off. The valve is held in this normal position by means of the spring 49, one end of which rests against the spring abutment cup 48, as has been mentioned, the other end engaging with the abutment cup 53 secured to the valve 51 adjacent its lower end. From this it may be seen that spring 49 exerts a force in one direction tending to hold the valve member 46 against its seat while acting in the other direction to hold the valve head 52 of the valve member 51 against its seat. Valve member 51 is provided with a channel in the form of a flattened portion 54 thereby providing communication between the cylinder and an annular recess formed in the valve member 51 beneath the valve head 52. Thus the lifting of the valve 51 so that its head 52 is moved off the seat, will permit communication between the passage 41 and the interior of the cylinder through the passage formed by the flat portion 54. This provides one of the parallel paths of restricted fluid flow. The other path is provided by the passage 55 coaxially provided in the valve 51. A metering pin 56, carried on the nut 57 which is adapted to screw into a threaded aperture in the bottom 25 of the cylinder, extends coaxially into the passage 55. A metering pin of desired size may be placed in the cylinder so as properly to regulate the fluid flow through this coaxial passage. From this it may be seen that the valve 51 provides parallel passages for the return flow of fluid from the cylinder to the casing when the piston is moved into the cylinder, both of these passages restricting said return flow of fluid, the one through the space between the sleeve 45 and the valve member 51 being normally closed by the valve head 52 engaging its valve seat, the other through the coaxial passage 55 being constantly open.

In order to eliminate chattering or noisy operation of the valve 51 due to numerous impulses caused by the vehicle hitting a rough road bed, valve 51 is provided with an extending portion 60 which fits loosely in the chamber 39 provided in the cap member. The coaxial passage 55 of the valve extends from its one end through the extending portion 60 so that it communicates with the chamber 39 formed in the cap member.

The operation of the device is as follows:

When the vehicle wheels strike a pronounced bump, the spring 21 of the vehicle will be flexed upwardly toward the vehicle frame 20, the inertia of the vehicle on the frame 20 preventing the vehicle from moving upwardly with the spring. This will permit the spring 50 within the piston to move the piston upwardly out of the cylinder, the engagement of the cap member on the piston with the lever arm 26 rotating said lever arm in counter-clockwise direction. The pressure of the oil upon the valve member 46 will overcome the effects of spring 47 to hold it closed and thus the fluid from the casing 23 will flow through passages 41 and 44 past the now open valve 42 into the cylinder. As soon as the spring 21 starts to return to its normal position, the normal tendency of the body of the vehicle is to move upwardly; however, the tendency of the body and spring to separate will cause a pull on the cable or strap 30, thereby rotating the shaft 28 and its lever arm 26 in a clockwise direction, the engagement of said lever arm with the piston moving said piston into the cylinder. Such movement of the piston into the cylinder creates a pressure upon the fluid in the cylinder thus causing it first to flow through the passage 55 past the metering pin into the chamber 39 and then in the space between the extending portion 60 and the walls of said chamber through passage 41 back to the casing. Continued movement of the piston downwardly will create an excessive oil pressure within the cylinder which will lift the spring loaded valve 51 so that the head 52 thereof will be moved off its seat, thus providing a second, parallel path from the cylinder through space or passage 54 past the valve head 52 through the passage 41 into the casing. It will be seen that the return of the fluid from the cylinder to the casing is through two parallel paths of restricted flow.

A rough road upon which the vehicle is traveling will cause repeated spring deflections, thus the piston will be moved up and down quite often so that repeated operation of the valve 51 obtains.

To eliminate chattering or noisy operation of this valve, the dash pot is provided, including valve portion 60 which extends loosely into the chamber 39, and is fed from the coaxial passage 55. The fluid located above the extending portion 60 and about the same will tend to dampen excessive movement of the valve 51 and thus substantially eliminate noisy operation thereof as well as having a tendency to reduce fluid flow noises. The structure of the dash pot is such that the flow of fluid from the cylinder through the passage 55 to the casing 23 is in no way hindered, this flow being utilized on its way to the casing as an absorbing element to reduce noise.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a fluid containing casing; a cylinder communicating with said casing; a piston in said cylinder; valves in said piston providing for the free flow of fluid from the casing to the cylinder when the piston moves in one direction and the restricted return flow of fluid from the cylinder to the casing when the piston moves in the opposite direction; and a dashpot for cushioning the movements of the fluid flow restricting valve, said dashpot comprising a cylinder portion provided by the head of the piston and a plunger provided by the said fluid flow restricting valve, said plunger fitting into the cylinder portion so as to provide a fluid conducting space between the adjacent plunger and cylinder walls, the dashpot being fed with fluid flowing from the fluid flow restricting valve.

2. A shock absorber comprising in combination, a fluid containing casing; a cylinder communicating with said casing; a piston in said cylinder; valves in said piston providing for the free flow of fluid from the casing to the cylinder when the piston moves in one direction and the restricted return flow of fluid from the cylinder to the casing when the piston moves in the opposite direction; and means for cushioning the movements of the fluid flow restricting valve, substantially to prevent chattering and noisy operation thereof, said means comprising a recess provided in the cylinder head and a tubular extension provided by the fluid flow restricting valve, said extension fitting loosely into said recess so as to provide a fluid conducting space between the outer wall of the plunger and the inner wall of said recess, a restricted fluid flow from said valve being discharged through the tubular extension into the recess.

3. A shock absorber comprising in combination, a casing providing a fluid reservoir; a closed end cylinder attached to and communicating with said casing; a piston in the cylinder; means for moving the piston in either direction; a valved duct providing for the relatively free flow of fluid when the piston moves in one direction; but preventing any flow of fluid therethrough when the piston moves in the other direction; a valve member movable with the piston for providing a constantly restricted flow of fluid from the cylinder into the fluid reservoir in response to the movement of the piston in said other direction, said valve member being movable relative to the piston for providing a second fluid flow from the cylinder into the reservoir when the piston moving in said other direction has properly increased the pressure exerted upon the fluid; and a cushioning device comprising a portion provided by the piston and a portion of said valve member, said cushioning device being fed by the constantly restricted flow of fluid through said valve member, substantially preventing chattering and noisy operation of the valve member.

4. A shock absorber comprising in combination, a casing providing a fluid reservoir; a cylinder communicating with said casing; a piston in said cylinder; means for moving the piston in either direction; valves in the piston, one of which provides for the free flow of fluid from the casing to the cylinder when the piston is moved in one direction, the other having parallel passages providing for the return of the fluid, from the cylinder to the casing, at a restricted flow, when the piston is moved in the other direction; and a dash-pot comprising a recess in the piston, into which loosely extends a portion of the fluid flow restricting valve, said dash-pot receiving all of the fluid passing though one of the parallel passages of said valve, whereby chattering and noisy operation of said valve is substantially eliminated.

5. A shock absorber comprising in combination, a casing providing a fluid reservoir; a cylinder attached to and communicating with said casing; a piston in said cylinder; means for moving the piston in either direction; valves in said piston, one of which provides for the free flow of fluid from the casing to the cylinder when the piston is moved in one direction, the other providing parallel passages for the return of the fluid from the cylinder to the casing at a restricted flow, when the piston is moved in the other direction, one of said parallel passages being continually open the other normally closed; and a dash-pot provided with fluid from the said continually open passage for dampening the movements of the fluid flow restricting valve to substantially eliminate chattering and noisy vibration thereof.

6. A shock absorber comprising in combination, a fluid containing casing; a cylinder communicating with said casing; a piston in said cylinder; valves in said piston providing for the free flow of fluid from the casing to the cylinder when the piston moves in one direction and the restricted return flow of fluid from the cylinder to the casing when the piston moves in the opposite direction; means for varying the restriction to the flow of fluid from the cylinder to the casing; and a cushioning means provided by the piston and the fluid returning therethrough to the casing for substantially eliminating the chattering and noisy operation of the valve providing for the restricted fluid flow.

7. A shock absorber comprising in combination, a fluid containing casing; a cylinder communicating with said casing; a piston in said cylinder; valves in said piston providing for the free flow of fluid from the casing to the cylinder when the piston moves in one direction and the restricted return flow of fluid from the cylinder to the casing when the piston moves in the opposite direction; means for varying the restriction to the flow of fluid from the cylinder to the casing in accordance with the piston position in the cylinder; and a cushioning means provided by the piston and the fluid returning therethrough to the casing for substantially eliminating the chattering and noisy operation of the valve providing for the restricted fluid flow.

8. A shock absorber comprising in combination, a casing providing a fluid reservoir; a cylinder communicating with said casing; a piston in said cylinder; means for moving the piston in either direction; valves in the piston, one of which provides for the free flow of fluid from the casing to the cylinder when the piston is moved in one direction, the other having parallel passages providing for the return of the fluid, from the cylinder to the casing, at a restricted flow, when the piston is moved in the other direction; means supported by the cylinder for varying the degree of restriction of one of said parallel passages; and a dash-pot for receiving all of the fluid flowing through the passage including said means to substantially eliminate chattering and noisy operation of the fluid flow restricting valve.

In testimony whereof I hereto affix my signature.

GEORGE W. ELSEY.